United States Patent [19]

Yasuda

[11] 3,997,173
[45] Dec. 14, 1976

[54] INSIDE FORCE CANCELLING DEVICE FOR TONE ARM OF RECORD PLAYER

[75] Inventor: Shiro Yasuda, Yokohama, Japan

[73] Assignee: Sony Corporation, Tokyo, Japan

[22] Filed: Oct. 2, 1975

[21] Appl. No.: 618,938

[30] Foreign Application Priority Data

Oct. 8, 1974    Japan .......................... 49-115897

[52] U.S. Cl. ........................................... 274/23 R
[51] Int. Cl.² ....................................... G11B 3/10
[58] Field of Search ..................................... 274/23

[56] References Cited

UNITED STATES PATENTS

| 2,300,149 | 10/1942 | Guedon | 274/23 R |
| 2,647,753 | 8/1953 | Goldmark | 274/23 R |
| 3,380,744 | 4/1968 | Ohnishi et al. | 274/23 R |

*Primary Examiner*—Richard E. Aegerter
*Assistant Examiner*—John W. Shepperd
*Attorney, Agent, or Firm*—Lewis H. Eslinger; Alvin Sinderbrand

[57] ABSTRACT

In a record player in which the friction of the pickup stylus in respect to a rotated record disc results in a so-called inside force acting to turn the tone arm in the inward direction with the magnitude of such inside force varying in accordance with the stylus position in the spiral record groove; an inside force cancelling device includes a cam follower, for example, in the form of a roller, spaced radially from the turning axis of the tone arm and coupled with the latter to move in an arcuate path with the tone arm, and a cam member having a cam surface extending along such arcuate path and being inclined in respect to the direction of movement of the cam follower so that the urging of the cam member against the cam follower, for example, by the force of gravity acting on a weight mechanically coupled to the cam member, causes the inclined cam surface to exert a force on the cam follower in the direction for opposing the turning of the tone arm by the inside force. The cam surface is given different angles of inclination at locations therealong so that the force exerted on the cam follower is varied to counteract the varying magnitude of the inside force. Further, a deactivating device is provided to move the cam member away from the cam follower to an inactive position and then to hold the cam member in such inactive position.

10 Claims, 6 Drawing Figures

INSIDE FORCE CANCELLING DEVICE FOR TONE ARM OF RECORD PLAYER

BACKGROUND OF THE INVENTION

1. Field of the Invention

This invention relates generally to phonograph record players, and more particularly is directed to an improved inside force cancelling device for the tone arm of a record player.

2. Description of the Prior Art

In general, during the playing of a phonograph record disc, a pickup stylus carried by a tone arm is urged, with a predetermined stylus pressure, against the rotated phonograph record disc so as to engage in, and track the spiral record groove of the disc. Such stylus pressure gives rise to a frictional force acting on the tone arm in a direction tangential to the record groove at the point where the latter is engaged by the stylus. Since the tone arm usually is provided with an angled or offset end portion and over-hang in order to compensate for any tracking error, the described frictional force has a first component extending through the substantially vertical axis about which the tone arm is swingable during tracking of the record groove, and a second component substantially at right angles to the first component and urging the tone arm to swing in the inward direction, so as to press or force the pickup stylus against the inner side wall of the record groove. Such second component of the frictional force is usually referred to as the "inside force" and, if allowed to act on the tone arm, causes the forces of the pickup stylus against the opposite side walls of the record groove to be unequal. More specifically, as a result of the inside force, the force of the pickup stylus against the inner side wall of the groove is increased while the force of the pickup stylus against the outer side wall of the record groove is decreased, and such unequal pressures or forces of the pickup stylus against the opposite side walls of the record groove deleteriously affect the reproduction of the recorded sound. For example, the unequal forces may cause abnormal abrasion of the stylus tip and increased distortion particularly in the case of a stereophonic recording in which the decreased pressure or force of the stylus against the outer side wall of the groove results in the imperfect tracking or tracing of such side wall in which the right-hand channel sounds are recorded. The undesirable effects of the inside force are particularly acute in the case of record players having cartridges intended to operate with a low stylus pressure.

Various devices have been proposed for cancelling or counteracting the inside force acting on the tone arm. For example, in one existing inside force cancelling device for the tone arm of a record player, a bell-crank having a substantially vertical arm and a substantially horizontal arm is pivoted on the base of the tone arm mount and has a weight adjustable along the horizontal arm so as to urge the vertical arm against a rod extending radially from the shaft of the mount which turns with the tone arm in response to tracking of the spiral record groove. The parts are arranged so that the force of the vertical arm of the bell-crank against the radial rod produces a turning moment acting on the tone arm in the direction opposed to the turning moment resulting from the inside force. However, the inside force acting on the tone arm varies with changes in the radial distance from the center of the phonograph record disc to the position of the pickup stylus in the spiral record groove. In many instances, such variation of the inside force is not unidirectional, that is, as the mentioned radial distance is progressively decreased during playing of the phonograph record disc, the inside force may initially decrease to a minimum value and thereafter increase. It will be apparent that the turning moment applied to a tone arm by the above described existing inside force cancelling device does not vary in correspondence with such non-uniform variation of the inside force and, therefore, is incapable of accurately cancelling or compensating for the latter.

In another existing or proposed inside force cancelling device, the previously described device is supplemented by a weight suspended from one end of a string having its other end connected to the rod extending radially from the vertical mounting shaft for the tone arm. Intermediate its ends, the string engages a guide which is located on the mounting base so that, as the radial rod moves in a horizontal plane in response to turning of the tone arm, the end portion of the string secured to the rod forms a varying angle relative to such horizontal plane, and thereby varies the horizontal component of the force applied to the rod, and hence to the tone arm, as a result of the suspended weight. Although the last mentioned device may be adjusted to apply a turning moment to the tone arm that approximately counteracts the inside force, even this relatively complicated and fragile arrangement is incapable of accurately compensating for the inside force at all positions of the pickup stylus in the spiral record groove.

It is further to be noted that the above described existing inside force cancelling devices always act on the tone arm to urge the latter to swing in the outward direction so that, when the stylus pressure is being adjusted, for example, after replacement of a cartridge or the like, the inside force cancelling device may cause inadvertent swinging of the tone arm in the outward direction and thereby damage the stylus tip. Accordingly, during adjustment of the stylus pressure, it may be necessary to remove each of the existing inside force cancelling devices from the associated record player or to manually hold such device for preventing the operation thereof.

OBJECTS AND SUMMARY OF THE INVENTION

Accordingly, it is an object of this invention to provide an inside force cancelling device for the tone arm of a phonograph record player which avoids the above described disadvantages of the existing devices.

Another object is to provide an inside force cancelling device which is operative to fully and accurately counteract or compensate for the inside force acting on the tone arm at all positions of the pickup stylus in the spiral record groove.

Still another object is to provide an inside force cancelling device, as aforesaid, which is of relatively simple and sturdy construction, as well as being easy to assemble.

A further object is to provide an inside force cancelling device, as aforesaid which may be easily rendered inactive or inoperative, for example, as during adjustment of the pickup stylus pressure or when the record player is being transported.

In accordance with an aspect of this invention, an inside force cancelling device includes a cam follower, for example, in the form of a roller, spaced radially from the turning axis of the tone arm and coupled with the latter to move in an arcuate path with the tone arm when the pickup stylus tracks the spiral record groove of a rotated phonograph record disc, and a cam member having a cam surface extending along such arcuate path of the cam follower and being inclined in respect to the direction of movement of the cam follower so that the urging of the cam member against the cam follower, for example, by the force of gravity acting on a weight mechanically coupled to the cam member, causes the inclined cam surface to exert a force on the cam follower in the direction for opposing the turning of the tone arm by the inside force. Further, the cam surface is given different angles of inclination at locations therealong so that the force exerted thereby on the cam follower is varied in response to turning movement of the cam follower with the tone arm for accurately counteracting the varying magnitude of the inside force acting on the tone arm.

It is a further feature of the invention to provide the above generally described inside force cancelling device with a deactivating device which is operative to move the cam member away from the cam follower to an inactive position and then to hold the cam member in such inactive position. More particularly, in a preferred embodiment of the invention, the cam member is supported adjacent one of its ends on a pivot shaft with a weight being mechanically connected to the cam member for urging the latter to swing about such pivot shaft in the direction toward the cam follower, and the deactivating device includes two clamping members located on the pivot shaft with the cam member axially therebetween, and one of such clamping members is threadably engaged with the pivot shaft so that turning of that one clamping member in one direction reduces the axial distance between the clamping members for clamping the cam member therebetween. The direction of turning of one of the clamping members for clamping the cam member is opposed to the direction in which the cam member is urged toward the cam follower by the weight so that, prior to the final clamping of the cam member, the turned clamp member fictionally induces the movement of the cam member to its inactive position away from the cam follower.

The above, and other objects, features and advantages of the invention, will be apparent in the following detailed description of an illustrative embodiment which is to be read in connection with the accompanying drawings.

DESCRIPTION OF A PREFERRED EMBODIMENT

Figure 1:
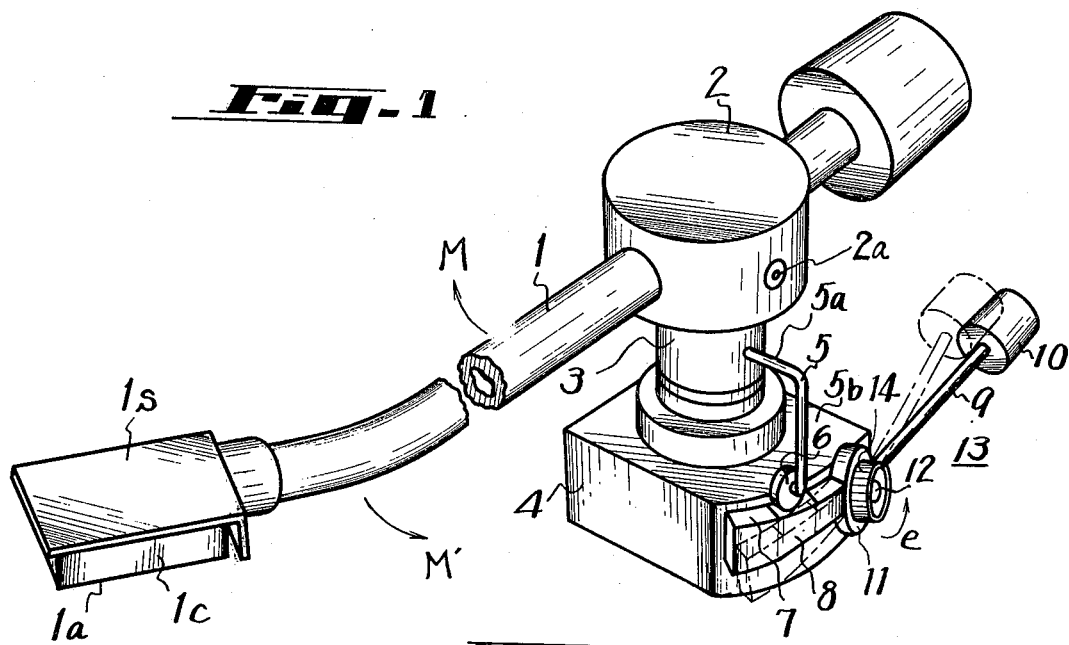
FIG. 1 is a perspective view showing a tone arm assembly for a phonograph record player provided with an inside force cancelling device according to one embodiment of this invention.

Referring to the drawings in detail, and initially to FIG. 1 thereof, it will be seen that a tone arm assembly of a type adapted to be provided with an inside force cancelling device according to this invention includes a tone arm 1 which is angled or offset inwardly in respect to an associated turntable (not shown), and which is provided at one end with a cartridge shell 1s receiving a cartridge 1c provided with a pickup stylus 1a adapted to engage or track the spiral record groove of a phonograph record disc, as is well known. The end portion of tone arm 1 remote from cartridge shell 1s is mounted in a bearing member 2 which is gimbaled, as at 2a, in respect to the upper end portion of a substantially vertical support shaft 3 so that tone arm 1 may swing vertically relative to shaft 3 while being coupled with the latter for turning or swinging about the axis of shaft 3. The lower end portion of support shaft 3 is journalled in a fixed base 4 so that shaft 3 is rotatable about its vertical axis, for example, as when pickup stylus 1a tracks the spiral record groove of a phonograph record disc during playing of the latter.

The illustrated embodiment of an inside force cancelling device 13 according to this invention is shown to comprise an arm 5 having a horizontal portion 5a which extends radially outward from support shaft 3 and a vertical portion 5b which depends from the outer end of arm portion 5a and, at its lower end, supports a cam follower 6 shown to be constituted by a rotatable roller. It will be apparent that cam follower roller 6 is spaced radially from the axis of shaft 3 indicated at 0 on FIG. 4 so as to move in an arcuate path C about such axis in response to turning of the tone arm, as during playing of a phonograph record disc. For the sake of convenience, support arm 5 may lie in a plane extending radially in respect to the axis of shaft 3 substantially at right angles in respect to the line which extends from the axis of shaft 3 to the tip of the pickup stylus 1a, that is, the line extending between the points 0 and P, respectively, on FIG. 4.

The inside force cancelling device 13 according to this invention is further shown to comprise a cam member 8 (FIGS. 1–3) providing, along its upper edge, a cam surface 7 which is arcuate, as viewed from above, so as to extend along the arcuate path of cam follower roller 6. The cam surface 7 is generally inclined upwardly from right to left as viewed on FIG. 2 in respect to the horizontal direction of movement of cam follower roller 6 in its arcuate path. As hereinafter described in detail, cam member 8 is urged upwardly, that is, against cam follower roller 6 so that inclined cam surface 7 will exert a force on roller 6 as indicated by the arrow f on FIG. 2.

In the illustrated embodiment of the invention, one end of cam member 8 is joined to a collar 11 which is rotatable on a pivot shaft 12 extending from base 4 so that cam member 8 is pivotally movable about the axis of shaft 12 for movement of the cam member toward and away from cam follower roller 6. A beam element 9 extends from collar 11 in the direction generally opposed to cam member 8 and carries a weight 10. It will be apparent that the force of gravity acting on weight 10 urges the assembly constituted by cam member 8, collar 11, beam 9 and weight 10 to turn in the clockwise direction, as viewed on FIG. 2, about the axis of pivot shaft 12, and thereby urges cam member 8 upwardly against cam follower roller 6. In order to permit adjustment of the force with which cam member 8 is urged upwardly against the cam follower roller, the position of weight 10 along beam element 9 may be varied, for example, by providing weight 10 with a threaded bore which engages threads 9a on the beam element.

In place of the beam element 9 and weight 10 provided for urging cam member 8 upwardly against cam follower roller 6, a torsion spring (not shown) may be connected between collar 11 and pivot shaft 12 for similarly urging cam member 8 to swing upwardly about the axis of its pivot shaft.

Figure 2:
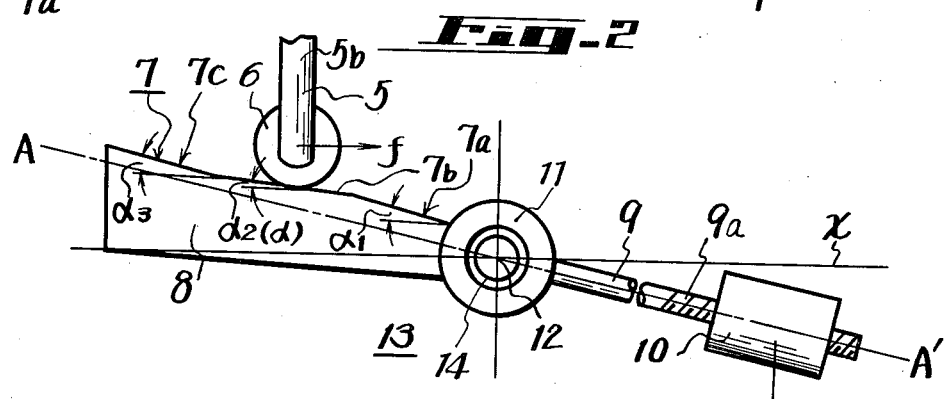
FIG. 2 is an enlarged side elevational view of the inside force cancelling device of FIG. 1.

It will be understood that, as the pickup stylus 1a tracks the spiral record groove of a phonograph record disc during the playing thereof, tone arm 1 swings horizontally inward about the axis of vertical support shaft 3 and, by reason of the coupling of cam follower roller 6 to such shaft 3, roller 6 moves in its respective arcuate path along cam surface 7 from right to left, as viewed on FIG. 2. Since the inside force acting on tone arm 1 varies during the tracking of the spiral record groove, as hereinafter described in detail, the force $f$ exerted on roller 6 by cam surface 7 has to be correspondingly varied for fully counteracting or compensating for the varying inside force. In the inside force cancelling device 13 according to this invention, the required variation in the force $f$ acting on roller 6 is simply achieved by suitably varying or changing the inclination of cam surface 7 at locations along the latter.

In explaining the manner in which the inside force acting on tone arm 1 varies during the playing of a phonograph record disc, reference will now be made to FIG. 4 in which L is the effective length of tone arm 1, that is, the distance from the axis of shaft 3 indicated at 0 to the point P at which the pickup stylus 1a engages the record groove; $l$ is the radial distance from the axis 0 to the arcuate path C of the cam follower roller 6; R is the radial distance from the center Q of the phonograph record disc 15 to the point P at which the pickup stylus engages the spiral record groove; and D is the overhang of the tone arm, that is, the distance by which the effective length L of the tone arm exceeds the distance from the turning axis 0 to the center Q of the phonograph record disc. As is shown, the frictional force F acting on the tone arm as a result of the engagement of pickup stylus 1a in the spiral record groove of the rotated phonograph record disc is directed tangentially to the groove at the point P of contact of the stylus therewith. As a result of the angle $\theta$ included between the direction of the frictional force F and the line connecting the point O and P, the frictional force F has a component F' directed inwardly at right angles to the line O-P and which constitutes the previously mentioned inside force urging the tone arm to swing about the axis O.

It will be apparent that the inside force F' may be expressed as follows:

$$F' = F \sin \theta \qquad (1)$$

If the law of cosines is applied to the triangle OPQ, the following is obtained:

$$\cos(90° - \theta) = \frac{L^2 + R^2 - (L-D)^2}{2LR}$$

Since $\sin \theta = \cos(90° - \theta)$, the above may be rewritten as:

$$\sin \theta = \frac{L^2 + R^2 - (L-D)^2}{2LR} \qquad (2)$$

Further, the force F may be expressed as $F = \mu W g$, in which $\mu$ is the coefficient of friction of the stylus in respect to the record disc 15, W is the pressure of the stylus on the disc, and g is the gravitational acceleration.

Applying $F = \mu W g$ and equation (2) to equation (1), the latter may be rewritten as follows:

$$F' = \mu W g \frac{L^2 + R^2 - (L-D)^2}{2LR} \qquad (3)$$

Figure 5:
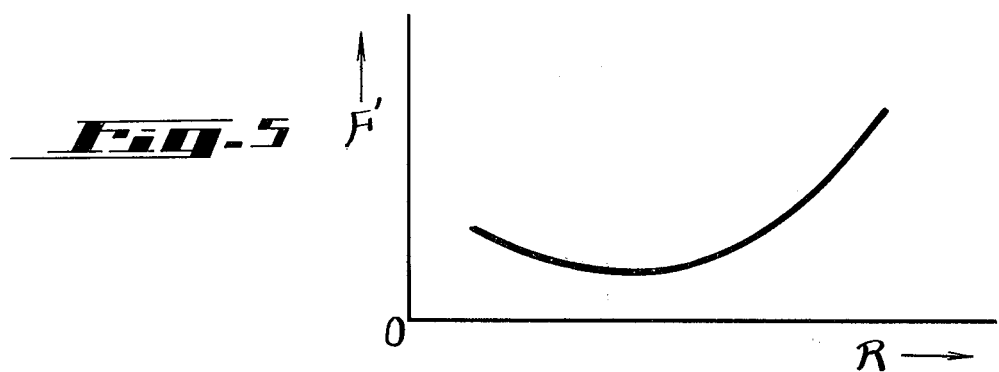
FIG. 5 is a graph illustrating the relationship that may exist between the magnitude of the inside force and the radial distance from the center of a phonograph record disc to the location or position at which the pickup stylus engages in the spiral record groove.

Thus, as the radial distance R changes, the inside force F' varies in accordance with equation (3). As indicated, for example, by the curve on FIG. 5, the variation of the inside force F' with changes in the radial distance R is not unidirectional, that is, as the record is played and the radial distance R is progressively decreased, the inside force F' may initially decrease to a minimum value and thereafter increase.

Such inside force F' produces a turning moment M tending to turn the tone arm 1 in the inward direction and which may be expressed as follows:

$$M = \mu W g L \frac{L^2 + R^2 - (L-D)^2}{2LR} \qquad (4)$$

In order to cancel such turning moment M, the force cancelling device 13 according to this invention has to apply to the tone arm 1 a turning moment M' which acts in the direction opposed to the moment M and has an amplitude equal to the latter, that is, an amplitude that also varies with changes in the radial distance R in the manner specified by equation (4).

Figure 3:
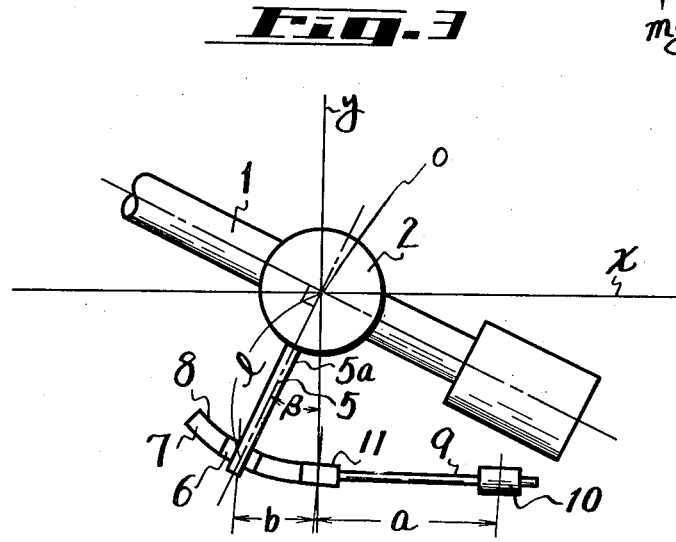
FIG. 3 is a fragmentary schematic top plan view illustrating portions of the tone arm assembly and inside force cancelling device of FIGS. 1 and 2, and to which reference will be made in explaining the operation of such device.

The manner in which the cam surface 7 of inside force cancelling device 13 is designed to apply such turning moment M' to the tone arm will now be described with reference to FIGS. 2 and 3 on which x is a horizontal axis lying in a plane which includes the axis of pivot shaft 12 and passing through the vertical axis 0 of tone arm support shaft 3, and y is a horizontal axis at right angles to axis x and which extends from the vertical axis of shaft 3 to the center of the collar 11 on shaft 12. It will be seen that the surface 7 of cam member 8 is, at each point along the latter, inclined by a particular angle $\alpha$ in respect to the horizontal plane containing axes x and y and which is parallel to the horizontal plane containing the arcuate path of movement of cam follower roller 6. Therefore, when cam member 8 is urged upwardly against cam follower roller 6 by reason of the weight 10, the force of the cam surface 7 against roller 6 has the horizontal component $f$ in the direction to produce the desired inside force cancelling moment M'. Such horizontal force component $f$ may be expressed as follows:

$$f = \frac{a}{b} \, mg \cdot \cos\alpha \cdot \sin\alpha \tag{5}$$

in which $a$ is the horizontal distance from the center of weight 10 to the axis of shaft 12, $b$ is the horizontal distance from the axis of shaft 12 to the point on cam surface 7 engaged with roller 6, $mg$ is the vertical downward force resulting from the weight 10, and $\alpha$ is the angle of the surface 7 relative to the horizontal at the point of contact with roller 6.

The inside force cancelling moment $M'$ which results from the force component $f$ may be expressed as follows:

$$M' = fl = \frac{al}{b} \, mg \cdot \cos\alpha \cdot \sin\alpha \tag{6}$$

in which, as previously mentioned, $l$ is the radial distance from the vertical axis 0 of shaft 3 to arcuate path C of roller 6 on the cam surface 7.

As stated previously, in order to cancel the inside force $F'$, the turning moments $M$ and $M'$ must be equal to each other, that is, the expressions for $M$ and $M'$ in equations (4) and (6), respectively must be equal to each other, as follows:

$$\mu W_g L \cdot \frac{L^2 + R^2 - (L-D)^2}{2LR} = \frac{al}{b} \, mg \cdot \cos\alpha \cdot \sin\alpha \tag{7}$$

Further, it may be assumed that the angle $\beta$ between axis $y$ and the radial direction from the vertical axis 0 of shaft 3 to the point of contact of roller 6 with cam surface 7, and the distances $b$ and $l$ are approximately related as follows:

$$b \approx l \tan\beta \tag{8}$$

Applying equation (8) and the formula $\sin 2\alpha = 2 \sin\alpha \cdot \cos\alpha$ to equation (7), the latter may be rewritten as follows:

$$\mu W_g L \, \frac{L^2 + R^2 - (L-D)^2}{2LR} = \frac{a}{\tan\beta} \, mg \, \frac{\sin 2\alpha}{2} \tag{9}$$

Figure 4:
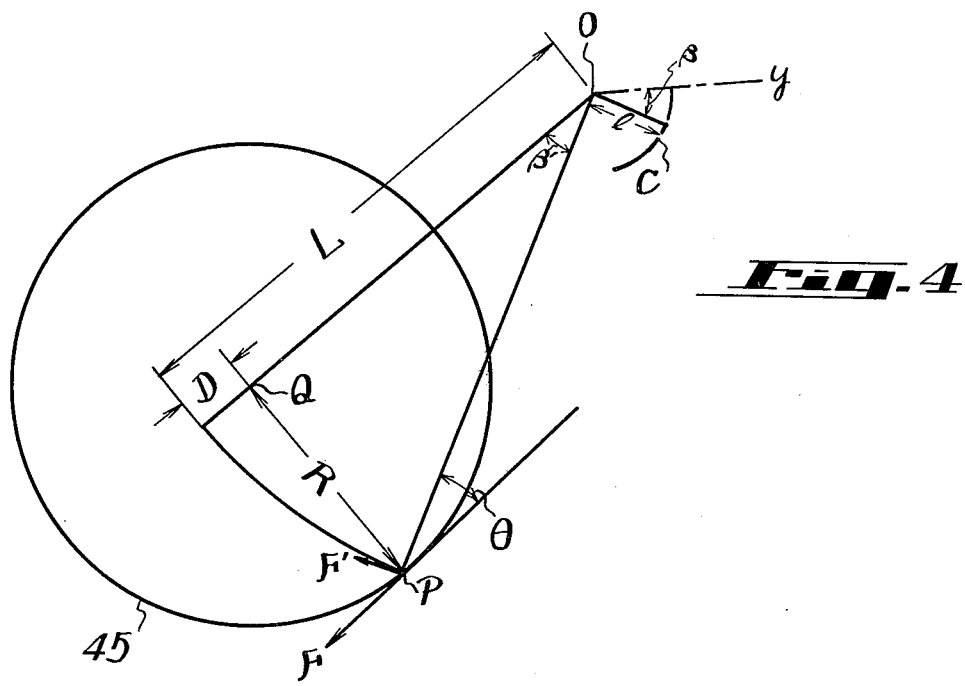
FIG. 4 is a diagrammatic view to which reference will be made in explaining the manner in which a cam surface of the inside force cancelling device according to this invention is designed.

Since tone arm 1 and the arm 5 supporting cam follower roller 6 are both fixed relative to shaft 3 in respect to turning about the vertical axis 0 of the latter, it will be apparent that decreasing of the radial distance R, and hence of the angle $\beta'$ between the line O-P and the line O-Q on FIG. 4, is accompanied by a corresponding increase in the angle $\beta$. Such relationship of the angles $\beta$ and $\beta'$ may be expressed as follows:

$$\beta = \beta'' - \beta' \tag{10}$$

in which $\beta''$ is a fixed angular value determined by the fixed angle between the axis $y$ and the line O-Q on FIG. 4 less the 90° or other fixed angle between the line O-P and the radial direction from the vertical axis 0 of shaft 3 to the point of contact of roller 6 with cam surface 7.

By again applying the law of cosines to the triangle OPQ, an expression for determining the angle $\beta'$ is obtained, as follows:

$$\cos\beta' = \frac{L^2 + (L-D)^2 - R^2}{2L(L-D)} \tag{11}$$

Since the values L and D are fixed, the value of angle $\beta'$ for each value of the radial distance R can be readily determined from equation (11), whereupon, the corresponding value of angle $\beta$ can be determined from equation (10). Finally, the fixed values of $\mu$, $Wg$, L, D, $a$ and $mg$, and the values for R and B can be inserted in equation (9) to provide the value of the angle $\alpha$ at the point on cam surface 7 engaged by roller 6 when the radial distance R has the selected value. Thus, equations (9), (10) and (11) define the functional relationship of the radial distance R to the angle $\alpha$ at corresponding points along cam surface 7 required to ensure that the turning moment $M'$ will be equal to the turning moment M for cancelling the inside force $F'$ at all positions of the stylus 1a along the spiral record groove of the phonograph record disc 15.

It will be apparent that the cam surface 7 having the required values of the angle $\alpha$ at all of the points therealong may have a smoothly varying curvature. Alternatively, and as shown particularly on FIG. 2, the cam surface 7 may consist of a plurality of successively arranged linear surface sections 7a, 7b and 7c arranged at angles $\alpha_1$, $\alpha_2$ and $\alpha_3$, respectively, to the horizontal. It will be understood that the angles $\alpha_1$, $\alpha_2$ and $\alpha_3$ are selected to correspond approximately to the values of the angle $\alpha$ determined as described above for the respective sections of cam surface 7. Thus, even when cam surface 7 is comprised of the successive linear surface sections 7a, 7b and 7c, the angles $\alpha_1$, $\alpha_2$ and $\alpha_3$ thereof are selected to ensure that the resulting moment $M'$ will be effective to substantially counteract or cancel the moment M and thereby eliminate the so-called inside force $F'$ and the deleterious effects of the latter.

The inside force cancelling device 13 according to this invention is further adapted to have a deactivating device associated therewith and by which the device 13 may be conveniently rendered inactive to remove the turning moment $M'$ from the tone arm. More specifically, as shown on FIG. 6, a deactivating device for the inside force cancelling device 13 may comprise a first clamping member 14 in the form of a knob which is screwed on a threaded end portion 12a of pivot shaft 12, and a second clamping member 15 which is secured to a surface of base 4 from which pivot shaft 12 extends so that collar 11 is rotatable on pivot shaft 12 between clamping members 14 and 15. It will be apparent that rotation of clamping member or knob 14 in one direction relative to pivot shaft 12 is effective to decrease the axial distance between clamping members 14 and 15, while rotation of knob 14 in the opposite direction increases such axial distance.

Preferably, the direction of the threads on end portion 12a of pivot shaft 12 is selected so that the direction of rotation of knob or clamping member 14 for decreasing the axial distance between the clamping members is opposed to the direction in which collar 11 and cam member 8 are urged to turn by the weight 10. Further, as shown, a frictional member 16, for example, in the form of a rubber ring, is secured to the end surface of knob 14 facing toward collar 11, while the clamping member 15 secured to the surface of base 4 about pivot shaft 12 may be constituted by a washer of friction-reducing material. In order to prevent inadvertent removal of knob 14 from the threaded end portion 12a of the pivot shaft, a stopper disc 17 may be secured against the end surface of threaded end portion 12a as by a screw 18.

Figure 6:
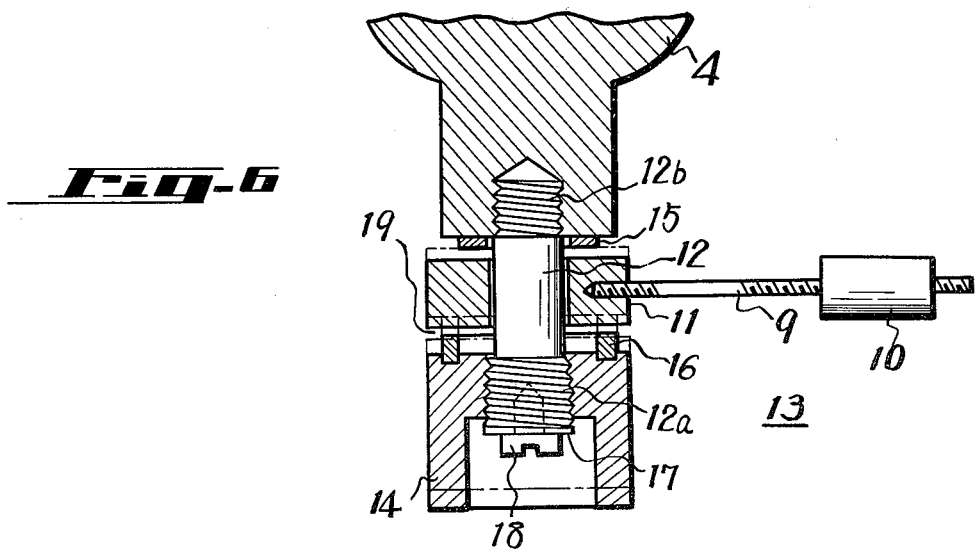
FIG. 6 is an enlarged sectional view taken along the line A—A' on FIG. 2, and showing details of deactivating means for the inside force cancelling device according to this invention.

It will be apparent that, when knob 14 is disposed on threaded end portion 12a as shown on FIG. 6 so that an axial gap 19 exists between rubber ring 16 and the adjacent surface of collar 11, collar 11 is free to turn on pivot shaft 12 and, therefore, inside force cancelling device 13 is operative, as previously described. However, when knob 14 is turned in the direction to decrease the axial distance between knob 14 and clamping member 15, for example, turned in the direction of the arrow e on FIG. 1, the axial gap 19 is eliminated to engage rubber ring 16 with the adjacent surface of collar 11 and, as the rotation of knob 14 is continued, collar 11 is frictionally coupled to knob 14 for turning with the latter, whereby to swing cam member 8 downwardly away from cam follower roller 6 against the urging of weight 10. The friction-reducing material of which clamping member 15 is formed serves to facilitate the turning of collar 11 with knob 14 upon obtaining the frictional engagement therebetween. Thus, in the course of the turning of knob or clamping member 14 in the direction for clamping collar 11, such collar is made to turn with knob 14 so as to displace the cam member 8 and weight 10 of the inside force cancelling device to an inactive position, as indicated in broken lines to FIG. 1. If desired, a suitable stop or limit member (not shown) may be provided, for example, projecting from base 4 below cam member 8, for limiting the movement of the cam member to its inactive position. After the cam member 8 has attained its inactive position, additional turning of the clamping member or knob 14 in the direction of the arrow e further reduces the axial distance between knob 14 and clamping member 15 and compresses rubber ring 16 so that, finally, collar 11 will be clamped or held with cam member 8 in its inactive position.

With the inside force cancelling device 13 being thus made inoperative or inactive, cam surface 7 does not act against roller 6 and, therefore, the turning moment M' is removed from tone arm 1 so that, for example, the stylus pressure may be adjusted without fear that the device 13 will inadvertently cause turning of tone arm 1 during such adjustment.

When it is desired to return inside force cancelling device 13 to its active or operative condition, it is only necessary to rotate knob or clamping member 14 in the direction opposed to the arrow e on FIG. 1 so as to increase the axial distance between knob 14 and clamping member 15 until collar 11 is again released and weight 10 can urge cam member 8 upwardly against roller 6.

Although the rotation of knob 14 has been described above as being transmitted frictionally to collar 11 by means of the rubber ring 16 during the turning of knob 14 in the direction for decreasing the axial distance between knob 14 and clamping member 15, it is to be understood that a similar transmission of the rotation of knob 14 to collar 11 may be effected by a suitable mechanical connection therebetween, for example, by a pin projecting axially from knob 14 and engaging in an arcuate slot in the adjacent face of collar 11. Further, although the rubber ring 16 has been disclosed as being secured to knob 14 and frictionally engaged with the adjacent surface of collar 11, such a rubber ring or a roughened surface may be provided on the collar 11 for frictional engagement with the adjacent end surface of knob 14.

It is further to be noted on FIG. 6 that the pivot shaft 12 may be mounted in respect to the base 4 by means of a threaded inner end portion 12b on pivot shaft 12 which is screwed into a correspondingly tapped bore in base 4. Preferably, the threads of end portion 12b are in the same direction as the threads of end portion 12a so that, when knob 14 is turned in the direction to clamp collar 11, the resulting rotational force transmitted to pivot shaft 12 will tend to drive threaded end portion 12b into the respective tapped bore rather than out of the latter.

Having described an illustrative embodiment of the invention and several specific modifications thereof, it is to be understood that the invention is not limited to specifically described embodiment and modifications, and that various changes and further modifications may be effected therein by one skilled in the art without departing from the scope or spirit of the invention as defined in the appended claims.

What is claimed is:

1. In a record player having a tone arm carrying a pickup stylus for tracking a spiral record groove on a record disc as the latter is rotated, apparatus comprising: a tone arm, mounting means for said tone arm permitting said tone arm to turn about an axis perpendicular to the plane of the record disc in response to said tracking, and in which the friction of said stylus in respect to the record disc results in an inside force acting to turn said tone arm in one direction about said axis with the magnitude of said inside force varying in accordance with the position of said stylus in the spiral record groove; and means for cancelling said inside force including cam follower means spaced radially from said axis and coupled with said tone arm to move in an arcuate path about said axis in response to turning of said tone arm, a cam member having a cam surface extending along said arcuate path and being upwardly inclined in respect to the forward direction of movement of said cam follower means in said path, and means mounting said cam member for urging said cam member against said cam follower means for causing said inclined cam surface to exert a force on said cam follower means in the direction opposed to said one direction of turning of said tone arm by said inside force, the inclination of said cam surface being different at spaced apart locations therealong so that said force exerted on the cam follower means is correspondingly varied to counteract said varying magnitude of the inside force.

2. A record player according to claim 1; further comprising means for supporting said cam member at one end thereof for pivotal movement about a respective axis, and wherein said means urging the cam member against said cam follower means is mechanically connected with said cam member to urge the latter to pivot about said respective axis.

3. A record player according to claim 2; in which said respective axis for pivotal movement of said cam member lies in a substantially horizontal plane; and in which said means urging the cam member includes a beam element fixed relative to said cam member and extending from said respective axis in substantial opposition to said cam member, and a weight on said beam element to gravitationally effect the urging of said cam member against said cam follower means.

4. A record player according to claim 3; further comprising means for adjusting said weight along said beam element for varying the force with which the cam member is urged against the cam follower means.

5. A record player according to claim 1; in which said mounting means includes a shaft rotatable about said axis and having said tone arm coupled with said shaft in respect to turning about said axis, and said cam follower means is carried by a support arm extending from said shaft.

6. A record player according to claim 5; in which said axis is substantially vertical, said support arm extends radially outward from said shaft and then downwardly and has said cam follower means mounted at the lower end of said arm, and said cam member is urged upwardly to engage said cam surface with said cam follower means from below the latter.

7. A record player according to claim 1; further comprising deactivating means operative to move said cam member to an inactive position spaced from said cam follower means and to hold the cam member in said inactive position.

8. A record player according to claim 7 in which said cam member is supported adjacent one of its ends on a pivot shaft, and said means urging the cam member against said cam follower means is mechanically connected to said cam member for urging the latter to swing about said pivot shaft in the direction towards said cam follower means; and in which said deactivating means includes first and second clamping means located on said pivot shaft with said cam member axially therebetween, and means threadably engaging one of said clamping means with said pivot shaft so that turning of said one clamping means in one direction relative to said pivot shaft reduces the axial distance between said first and second clamping means for clamping the cam member therebetween, the threadable engagement of said one clamping means with said pivot shaft being selected so that said one direction of turning of said one clamping means is opposed to said direction in which said cam member is urged toward the cam follower means, so that the turning of said one clamping means in said one direction frictionally induces the movement of said cam member to said inactive position prior to the clamping of said cam member.

9. A record player according to claim 8; in which said pivot shaft has its axis substantially in a horizontal plane; and in which said means urging the cam member against the cam follower means includes a beam element fixed relative to said cam member and extending from the axis of said pivot shaft in substantial opposition to said cam member, and a weight on said beam element to gravitationally effect the urging of said cam member against the cam follower means.

10. A record player according to claim 1; in which said cam surface is composed of successive linear surface sections each disposed at a respective angle of inclination in respect to said direction of movement of said cam follower means.

* * * * *